UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

PROCESS OF TREATING ALKALINE STORAGE BATTERIES.

No. 817,162.        Specification of Letters Patent.        Patented April 10, 1906.

Application filed September 29, 1904. Serial No. 226,487.

*To all whom it may concern:*

Be it known that I, THOMAS A. EDISON, a citizen of the United States, and a resident of Llewellyn Park, Orange, county of Essex, and State of New Jersey, have invented a certain new and useful Process of Treating Alkaline Storage Batteries Preparatory to Shipment Thereof, of which the following is a description.

One of the difficulties that was encountered in the commercial exploitation of my improved iron-nickel storage battery was the fact that in many instances cells failed in practice to reach the desired standard capacity indicated by careful tests made prior to the shipment of the same from the factory. In these batteries, as is well known, the negative mass when charged consists of a mixture of reduced iron and metallic mercury. In the shipment of these cells the electrolyte is removed not only to reduce weight, but to prevent any danger of its spilling out of the cell in transportation. After careful investigation into the cause of the unsatisfactory operation referred to I have found that it is due to the fact that since the cells are shipped in a partially-charged condition a part of the iron mass is metallic, which in the air becomes oxidized, resulting in the generation of heat, driving off the mercury more or less, and reducing the conducting capacity of the negative mass. In order to overcome this defect, I completely discharge the negative mass by sending a reversing-current through the battery, so that the iron is fully oxidized. Therefore no atmospheric oxidation can take place therein and no internal heating from this source can arise. In this condition the battery may be transported with entire safety with the electrolyte removed and without any danger of the mercury being vaporized to thereby affect the proper operation of the cell.

Having now described my invention, what I claim as new therein, and desire to secure by Letters Patent, is as follows:

1. The process of treating, prior to shipment, an alkaline storage battery, the negative mass of which contains when charged, finely-divided iron and metallic mercury, which consists in completely discharging the negative mass so as to fully oxidize the same and prevent atmospheric oxidation, substantially as and for the purposes set forth.

2. The process of treating, prior to shipment, an alkaline storage battery, the negative mass of which contains, when charged, finely-divided iron and metallic mercury, which consists in sending a reversing-current through the cell to completely oxidize the negative mass and prevent atmospheric oxidation, substantially as and for the purposes set forth.

This specification signed and witnessed this 26th day of September, 1904.

THOS. A. EDISON.

Witnesses:
    FRANK L. DYER,
    ANNA R. KLEHM.